United States Patent

[11] 3,584,939

| | | |
|---|---|---|
| [72] | Inventors | Marshall S. Olson<br>Minneapolis, Minn.;<br>Raymond D. Criss, Augusta, Kans. |
| [21] | Appl. No. | 822,364 |
| [22] | Filed | May 7, 1969 |
| [45] | Patented | June 15, 1971 |
| [73] | Assignee | N. P. Benson Optical Company<br>Minneapolis, Minn. |

[54] ATHLETIC SPECTACLES
2 Claims, 7 Drawing Figs.

[52] U.S. Cl. .................................................. 351/132, 351/94, 351/136
[51] Int. Cl. .................................................. G02c 5/12
[50] Field of Search ................................ 351/130, 126, 124, 115, 41, 94, 136, 132

[56] References Cited
UNITED STATES PATENTS

| 584,765 | 6/1897 | Alexander | 351/115 |
|---|---|---|---|
| 2,774,279 | 12/1956 | Olson et al. | 351/94 |
| 3,016,797 | 1/1962 | Liautaud | 351/94 |

Primary Examiner—David Schonberg
Assistant Examiner—John W. Leonard
Attorney—Williamson, Palmatier & Bains ABSTRACT: Athletic spectacles include a plastic spectacle frame which is comprised of a pair of angular lens supports which are interconnected by a bridge member. The nasal side of each lens support is provided with loops which serve to anchor a soft resilient arch which encases the bridge member and extends partially around the nasal side of each lens support. A pair of temples are provided and are pivotally connected to the spectacle frames to prevent pivotal movement of the temples through an arc of approximately 180°. The provision of the arch and the pivotal connection of the temples to the spectacle frames minimizes the occurrence of injury to a user and damage to the spectacles.

PATENTED JUN 15 1971 3,584,939

INVENTORS
MARSHALL S. OLSON,
RAYMOND D. CRISS
BY
Williamson, Palmatier
& Bains
ATTORNEYS 3,584,939

ATHLETIC SPECTACLES

SUMMARY OF THE INVENTION

Although there are some kinds of athletic spectacles now commercially available, many of these commercially available athletic spectacles are subject to damage although many precautions have been taken to minimize injury to a user. Some of the athletic spectacles now available do utilize cushions or resilient elements which are mounted on the bridge of the spectacles to minimize injury to a user when a collision occurs. However, it has been found that the manner in which the cushion or resilient element is applied to the bridge member and to the spectacle frame does have some undesirable features. Further, it has also been noted that the temples of conventional athletic spectacles are often subject to damage, especially when a relatively violent collision occurs.

It is therefore a general object of this invention to provide novel and improved athletic spectacles wherein a resilient arch encases the bridge and is positively secured to thermoplastic spectacle frames.

It is also an object of this invention to provide athletic spectacles which include spectacle frames having temples securely connected thereto so that the temples may pivot through an arc of approximately 180°. The temples are interconnected to the spectacle frames in such a manner that only arcuate smooth surfaces are provided so that not only does this arrangement minimize the occurrence of damage to the spectacles, but also minimizes the occurrence of any injury to the user.

These and other objects and advantages of this invention will more fully appear from the following description made in connection with the accompanying drawings wherein like reference characters refer to the same or similar parts throughout the several views, and in which:

DETAILED DESCRIPTION OF THE INVENTION

Figure 1:
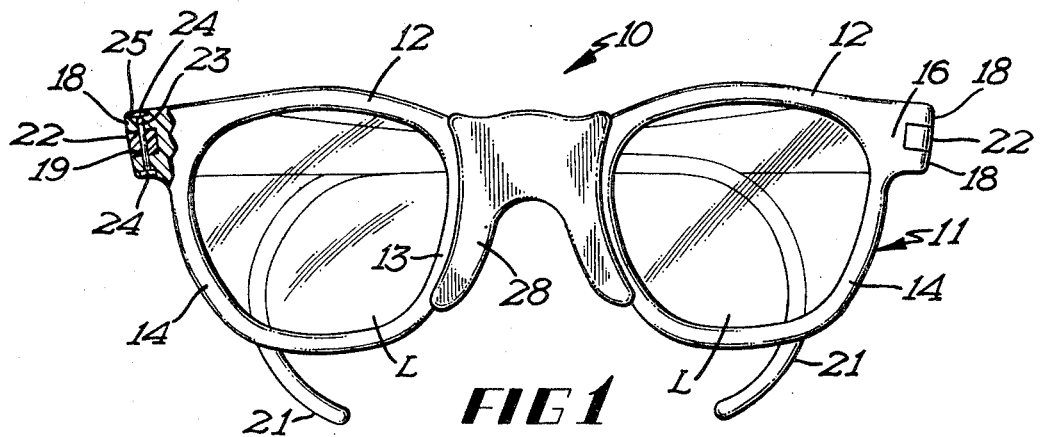
FIG. 1 is a front elevational view of the athletic spectacles with certain parts thereof broken away for clarity.
Figure 2:
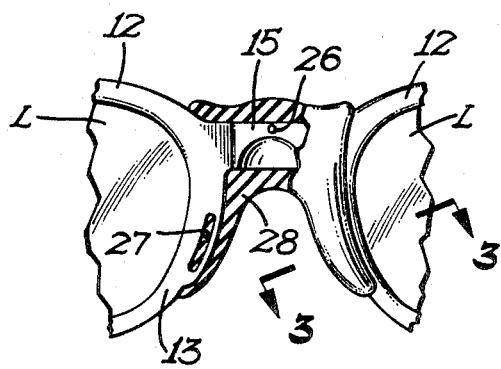
FIG. 2 is a fragmentary rear elevational view of a portion of the spectacle frames with certain parts thereof broken away for clarity.

Referring now to the drawings, and more specifically to FIG. 1, it will be seen that one embodiment of the novel athletic spectacles, designated generally by the reference numeral 10, is there shown. These athletic spectacles 10 include a spectacle frame 11 formed of a thermoplastic material, preferably nylon. The spectacle frame 11 is formed by means of an injection molding operation and includes a pair of annular lens supports 12 each including a nasal side 13 and a temporal side 14. Each lens support has an annular groove 12a formed in the interior surface thereof to receive and secure therewithin a lens L. The lens supports 12 are integrally formed and interconnected by a central bridge member 15, as best seen in FIG. 2.

The temporal side 14 of each lens support has an angular portion 16 integrally formed therewith and projecting therefrom. It will be noted that the concave surface 17 between each annular lens support and its associated angular portion is of smooth configuration to minimize any damage to a user if the spectacles are thrust with force or violently across the front of the face. This angular portion 16, which extends at substantially right angles with respect to the general plane of the spectacle frame, has a pair of spaced apart hinge elements 18 integrally formed therewith and projecting therefrom. These spaced apart hinge elements 18 define a recess 19 therebetween. The spectacles 10 also include a pair of temples 20, also formed of a thermoplastic material and preferably nylon, and the outer end of the temples are provided with bows 21. The inner end of each temple 20 is provided with a hinge element 22 which projects forwardly therefrom.

The hinge elements 18 are provided with apertures which are disposed in alignment with each other and the hinge element 22 is also provided with an aperture therethrough. The hinge element 22 of each temple is positioned in the recess 19 so that the aperture in the hinge element 22 is disposed in registering relation with the apertures of the associated pair of hinge elements 18. An elongate hinge pin 23, formed of a suitable metallic material, extends through the registering apertures to pivotally interconnect the temples 20 with the spectacle frame 11 to permit swinging movement of the temples relative to the temple frame. It will be noted that opposite ends of each hinge pin 23 have a head 24 integrally formed therewith and the heads 24 are slightly larger than the diameter of the shank of the pin. These enlarged head portions are also positioned in enlarged outer end portions 25 of the aperture in the hinge elements 18. These enlarged portions 25 of the apertures have a smaller diameter than the diameter of the heads 24 of the hinge pins so that the heads are snugly engaged within the enlarged portions 25.

Figure 4:
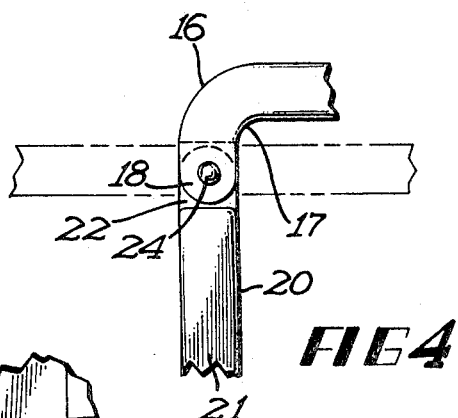
FIG. 4 is a fragmentary top plan view illustrating the interconnection of the spectacle frame with a temple, the temple being illustrated in one position of use in full line configuration, and in other positions of use by dotted line configuration.
Figure 3:
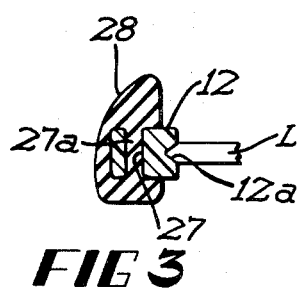
FIG. 3 is a cross-sectional view taken approximately along line 3-3 of FIG. 2 and looking in the direction of the arrows.

When the temples are pivotally interconnected to the spectacle frame by the hinge pins, the hinge pins are forced through the apertures in the hinge elements because of the somewhat resilient characteristic of the nylon. The heads of the hinge pins are seated in countersunk relation within the enlarged portions of the aperture and the nylon material will cold-flow around the shank of the hinge pin so that the hinge pin is snugly and positively gripped by the spectacle frame and the temples. It is pointed out, as best seen in FIG. 4, that the temples 20 may pivot relative to the spectacle frame through an arc of approximately 180°. With this arrangement, and in the event that the spectacles of the user are struck from the side so that the temples are moved violently across the front of a user's face, the capability of the temples to pivot in either direction from the normal position of use, as illustrated in full lines in FIG. 4, minimizes the occurrence of damage to the temples.

Referring again to FIG. 2, it will be seen that the central bridge member 15 has a small post 26 integrally formed therewith and projecting therefrom. This small post 26 actually is disposed substantially normal to the general plane of the spectacle frame 11. Each lens support 12 has an elongate slot 27 formed in the nasal side 13 thereof, and these elongate slots define loop members 27a. It will be noted that the loop members 27a actually extend toward each other and are disposed in the general plane of the spectacle frame.

Mounted upon a central bridge member 15 and completely encircling the same is a coating or resilient member 28 which is made of a soft, resilient and tough material. In the embodiment shown, a plastic material generally sold under the trade name of "Croton" is preferably used, although other yieldable materials, such as rubber-base materials, may be used. It will be noted that the coating 28 not only completely encircles the bridge member, but extends partially around the nasal side of each annular lens support. This coating extends through the slots 27 and thereby completely encircles and encases the loop members 27a so that the coating is very securely mounted on the spectacle frame. Since the coating 28 also completely encases the post 26, the post thereby serves to further anchor the coating to the spectacle frame.

Figure 5:
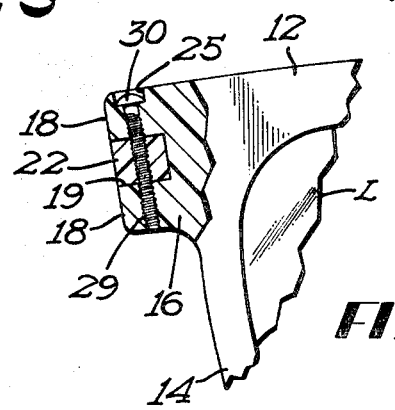
FIG. 5 is a fragmentary front elevational view of a portion of the athletic spectacles illustrating a modified hinge connection between the spectacle frame and a temple.

Referring now to FIG. 5, it will be seen that a slightly different embodiment of the hinge pin for interconnecting the hinge elements of the spectacle frame and the temples is thereshown. It will be noted that each of the annular lens supports of the spectacle frame includes an angular portion 16 which projects from each of the lens supports 12. The angular portion includes a pair of hinge elements 18, while the temple is also provided with a hinge element 22. The hinge elements 18 and 22 are identical to that shown in the embodiment of FIG. 1, but the hinge pin 29 which extends through the apertures of the hinge element has a threaded shank and has a head 30 at one end only. The thermoplastic material of the hinge elements 18 and 22 will cold-flow around the shank and threads of the hinge pin to firmly anchor the hinge pin with respect to the hinge elements. The head 30 of the hinge pin will also be positioned in countersunk relation with an enlarged portion 25 of the aperture in one of the hinge elements 18 to produce a countersunk effect. The aperture 25 will accordingly be slightly smaller than the diameter of the heads so that the material will cold-flow around the head. The temples through which each hinge pin 29 interconnects to the spectacle frame 11 are also capable of swinging through an arc of approximately 180° in the manner of the embodiment of FIGS. 1 through 4.

Figure 6:
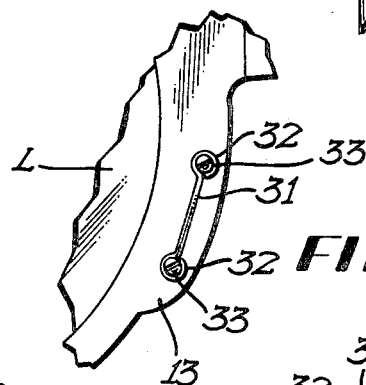
FIG. 6 is an enlarged fragmentary front elevational view of a portion of one lens support illustrating a modified form of the loop member.
Figure 7:
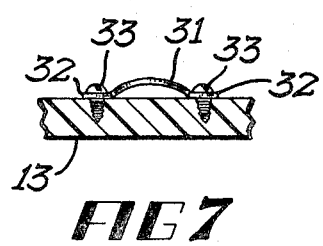
FIG. 7 is a cross-sectional view taken approximately along line 7-7 of FIG. 6 and looking in the direction of the arrows.

Referring now to FIGS. 6 and 7, it will be seen that a slightly modified form of the loop members would serve to anchor the coating or arch 28 as there shown. In this embodiment, each annular lens support 12 has a pair of elongate arcuately shaped looped members 31, preferably formed of metal or the like, secured to the nasal side thereof. It will be noted that the general plane of each loop is disposed substantially normal to the general plane of the spectacle frame 11 rather than being disposed in the plane of the spectacle frames in the manner of the embodiment of FIGS. 1 through 4. Each loop member 31 has eyelets 32 formed at the end thereof and suitable screws 33 secure the eyelets to the associated annular lens support. The coating 28 will completely encase and extend through the loop members 31 so that the loop members serve to anchor the coating in the manner of the embodiment of FIGS. 1 through 4.

From the foregoing description it will be seen that I have provided novel and improved athletic spectacles provided with an arch of somewhat yieldable material which encases the bridge portion of the spectacle frame to thereby minimize injury to a user. This coating is applied to the spectacle frame by a molding operation, and the spectacle frames are provided with loop members, as well as a post, integrally formed with a bridge to very firmly anchor the coating or arch to the nasal or bridge portion of the spectacle frames.

It will further be seen that the spectacle frames are formed of a suitable thermoplastic material, preferably nylon, with several of the anchoring features for the coating being molded in during the formation of the spectacle frames. The spectacles also include temples which are uniquely hinged to the spectacle frames so that the temples may pivot through an arc of approximately 180° and not only minimize the occurrence of damage to the spectacles but will also minimize any occurrence of injury to a user even when subjected to a violent collision.

Thus it will be seen that I have provided novel athletic spectacles which are not only of simple and inexpensive construction, but ones which include many desirable features for minimizing breakage or injury to a user not found in comparable devices.

We claim:

1. Athletic spectacles including
    a spectacle frame formed of thermoplastic material and including a pair of similar annular lens supports, each lens support including a nasal side and a temporal side, and having annular exterior surface and a lens-receiving grooved annular interior surface, each lens support having angular portion extending rearwardly in substantially right angular relation from the general plane of the spectacle frame, each angular portion having a pair of spaced apart hinge elements projecting therefrom,
    a pair of lenses, each mounted within one of said lens supports,
    a bridge member integrally formed with and interconnecting said lens supports,
    each lens support having a slot formed in the nasal side thereof, said slots forming loops which project towards each other, a post integrally formed with said bridge member and projecting therefrom,
    a soft resilient arch completely encasing the bridge member and extending over the exterior surface of the nasal side of each lens support to completely encase each loop member, and also encasing said post, said arch being spaced from the annular interior surface of each lens support,
    a pair of temples, each having inner and outer ends, each temple having a hinge element integral with the inner end thereof and projecting therefrom, each temple element positioned between the pair of hinge elements on one of said angular portions,
    a hinge pin connecting the hinge elements on each temple and lens support to permit pivotal movement of each temple through an arc of approximately 180°.

2. The athletic spectacles as defined in claim 1 wherein the hinge pin hingedly connecting each temple with the spectacle frame has a pair of enlarged heads, each being located at opposite ends thereof.